W. E. KEMMERICH.
AUTOMOBILE TIRE.
APPLICATION FILED JAN. 10, 1916.

1,217,461.

Patented Feb. 27, 1917.

WITNESSES:
Edward S. Burke
Herbert Chaudière

William E. Kemmerich
INVENTOR
BY H. Schweitzer
ATTORNEYS

UNITED STATES PATENT OFFICE.

WILLIAM E. KEMMERICH, OF NEW YORK, N. Y.

AUTOMOBILE-TIRE.

1,217,461.   Specification of Letters Patent.   Patented Feb. 27, 1917.

Application filed January 10, 1916. Serial No. 71,222.

*To all whom it may concern:*

Be it known that I, WILLIAM E. KEMMERICH, a subject of the Emperor of Germany, and a resident of the city, county, and State of New York, have invented certain new and useful Improvements in Automobile-Tires, of which the following is a specification.

This invention relates to improvements in tires for automobiles and other vehicles built entirely out of spring steel and wire or steel bands. It comprises a tire in which spring steel and wire or steel bands are woven together in such a manner as to produce a compact and at the same time a very resistant and resilient construction which is relatively light in weight, durable, inexpensive, easy to manufacture, efficient and reliable in operation, and which may be applied and removed from any existing automobile wheel without difficulty.

One object of the invention is to avoid compressed air so that troubles caused by punctures cannot occur.

In regard to these absolutely new features of construction the invention may be more fully described as follows:

In the accompanying drawings Figure 1 is a side elevation of a part of the new tire;

Figure 1:
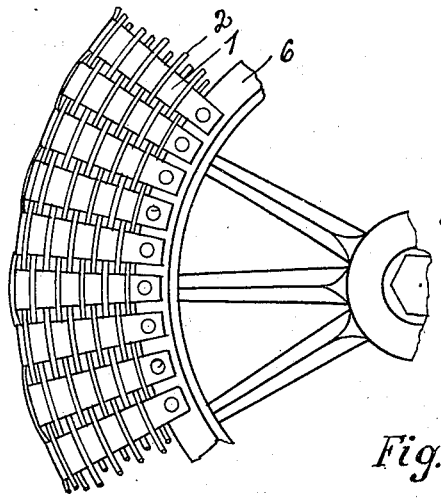
Figure 2:
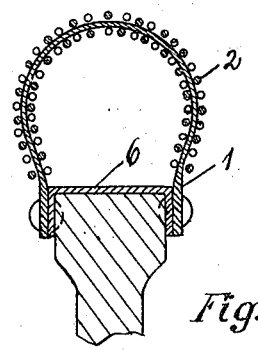
Fig. 2 is a cross section of the tire.

The new steel tire is made of horseshoe-like bent spring steel strips 1, and wire 2, or steel bands 3, very tightly woven together. The steel strips 1 may be riveted to the rim of the wheel which can be formed of a U-iron 6, or by two separate hoops or annular members 5 and 5' holding the rim 4 of the wheel. The annular members 5 and 5' are held together and strengthened by bolts 10, about six of which are used on one tire. By shaping the hoops 5 and 5' as shown in Fig. 4 the new tire may be readily applied to any existing automobile wheel.

Figure 3:
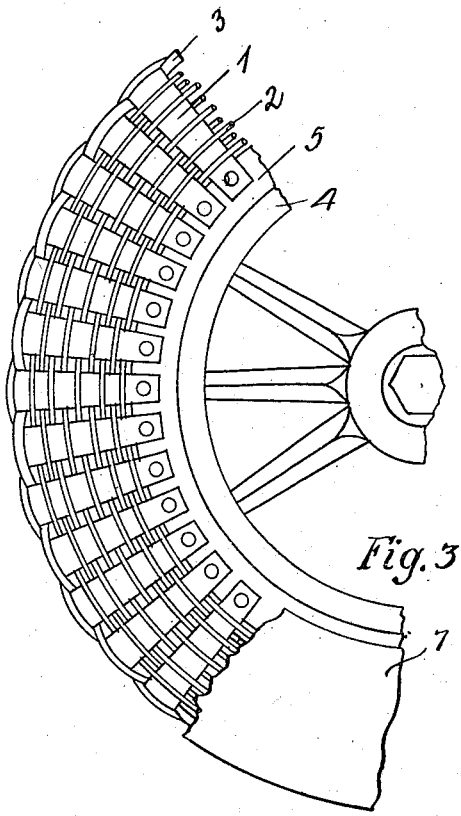
Fig. 3 is a side elevation of a part of a modified form of tire.
Figure 4:
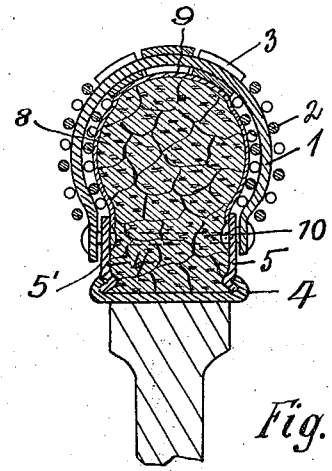
Fig. 4 is a cross section of the modification shown in Fig. 3, and illustrating a mode of applying the tire to an ordinary automobile rim.

In order to render more durable that part of the wheel which touches the ground and has to stand the friction of starting and braking the car, thicker wire or steel bands 3 can be used as shown in Figs. 3 and 4.

The steel springs and wire should be woven together as tightly as possible so that the meshes leave only very small openings, thereby avoiding as much as possible the penetration of sand and dirt into the inner part of the tire. For this purpose the tire can be covered, outside or inside, with leather or any other flexible cover as 7 or 9 respectively which would at the same time render the outer surface of the tire smoother and protect the tire to a certain extent from rusting. Rusting of the tire is more certainly prevented by galvanizing the whole construction or giving the same a good coating of rust proof paint.

The interior of the tire can be filled with cork 8 or other material. Cork especially does not diminish the resiliency of the tire and has at the same time the advantage of its light weight. Rubber, cotton, or other bulky material is also suitable for this purpose.

Contrary to most of the existing steel tires the present construction shows a uniform and pleasing appearance and can be used just as well for the lightest as for the heaviest cars. It can be built in various sizes without requiring any special machinery. Should a breakage occur the broken steel spring or wire can be easily replaced in a short time.

I claim:—

1. A resilient tire comprising a metallic fabric with a weft of spring steel strips of approximately horseshoe-like shape, the warp of the road-contacting portion of the tire consisting of bandiron, the warp of the sides of the tire consisting of wire and the interior being filled with a light bulky material.

2. A resilient tire comprising spring steel strips of horseshoe-like shape interwoven with wire on the sides and with bandiron at the road-contacting portion and attached near their ends to annular members so shaped as to fit the rim of an ordinary automobile wheel.

In testimony whereof, I have hereunto set my hand in the presence of two subscribing witnesses.

WILLIAM E. KEMMERICH.

Witnesses:
 WM. PLATT,
 I. M. STAFFORD.

Copies of this patent may be obtained for five cents each, by addressing the "Commissioner of Patents, Washington, D. C."